Jan. 8, 1924.
G. W. COBLENTZ ET AL
1,480,507
LAWN SPRINKLER
Filed Oct. 12, 1921
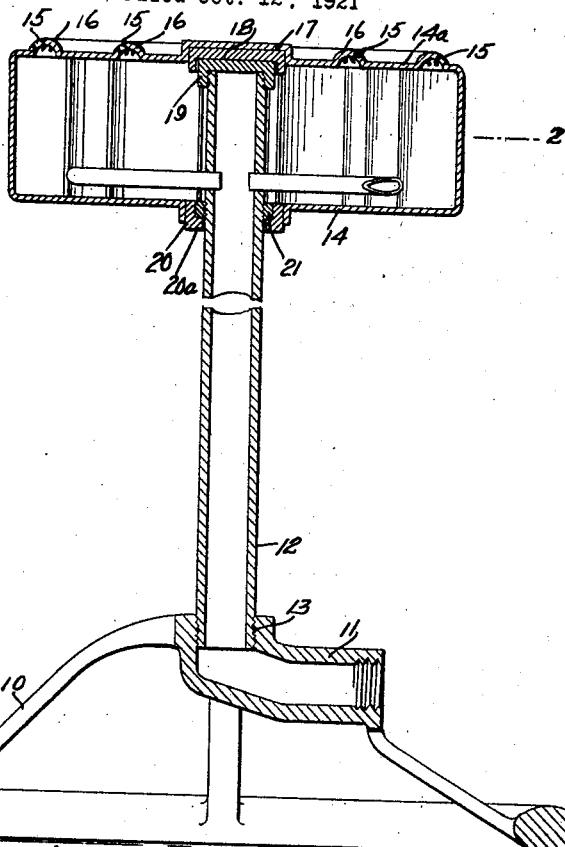
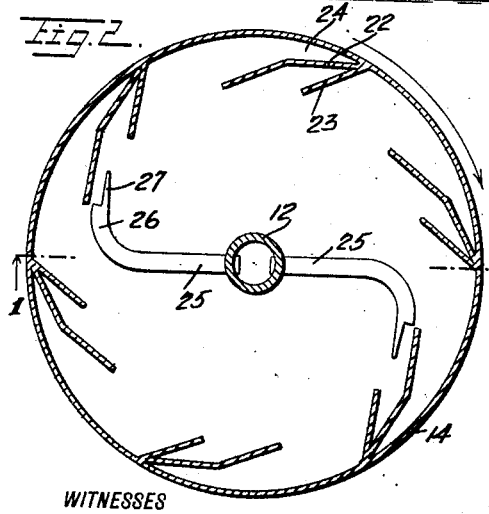
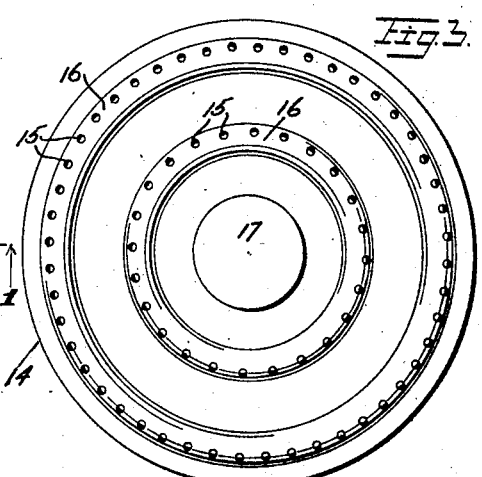
WITNESSES
H. T. Walker
INVENTORS
GEORGE W. COBLENTZ
J. R. FARIES
H. P. BOND
BY
ATTORNEYS Patented Jan. 8, 1924.

1,480,507

UNITED STATES PATENT OFFICE.

GEORGE WILLIAM COBLENTZ, JOSEPH ROLLINS FARIES, AND HENRY PAUL BOND, OF TACOMA, WASHINGTON.

LAWN SPRINKLER.

Application filed October 12, 1921. Serial No. 507,310.

*To all whom it may concern:*

Be it known that we, GEORGE W. COBLENTZ, JOSEPH R. FARIES, and HENRY P. BOND, citizens of the United States, and residents of Tacoma, in the county of Pierce and State of Washington, have invented a new and Improved Lawn Sprinkler, of which the following is a description.

Our invention relates to lawn sprinklers and more particularly to revolving sprinklers.

The invention has for its general object to provide a revolving sprinkler improved in various particulars whereby to provide novel means to revolve the sprinkler and to obtain an efficient discharge and spread of the water; as well as with a view to so mount the revoluble elements that they may freely respond to the turning force of the water pressure.

The invention more specifically has for an object to provide a simple construction of the parts making for convenience of assembling or disassembling, or repair.

The nature of the invention and its distinctive features and advantages will clearly appear as the description proceeds.

Reference is to be had to the accompanying drawings, it being understood that the drawings are merely illustrative of one example of the invention.

Figure 1 is a vertical section of a lawn sprinkler embodying our invention;

Figure 2 is a horizontal section as indicated by the line 2—2, Figure 1;

Figure 3 is a plan view of the revolving head or water box.

In carrying out our invention in practice, a suitable base 10 is provided, adapted to be set on a lawn to be watered and provided with an inlet 11 adapted to effect a connection with a hose. Rising from the base and communicating with the inlet is a hollow standard 12 here shown as threaded at its lower end into the base 10.

A revolving head 14 is provided in the form of a water box closed except for the provision of one or more annular series of holes 15 in the top 14ª, said holes advantageously being formed in annular raised beads 16 produced on the box 14ª at the top, said openings 15 having in practice a lateral inclination for the effective distribution of the water escaping through said holes under centrifugal force developed by the revolving box 14.

The top 14ª of the box is raised at the center as at 17 the raised center having at the underside a bearing disk 18 revolubly resting upon the cap 19 of the standard 12. At the bottom of the box 14 a bearing means is provided which may, as shown, advantageously consist of a bushing 20 in a central opening in the bottom of the box 14 and formed with a flange 20ª directed laterally inward beneath a collar 21 or the equivalent, said collar being rigid with the standard 12. The arrangement of the top and bottom bearings on the box 14 effectively prevents vertical displacement or tilting of said box while providing bearings therefor.

For revolving the box 14 we provide blades thereon at the interior disposed generally at an angle to the inner surface of the box. Said blades are designated generally by the numeral 22. Each blade 22 is formed of side members at an acute angle to each other presenting a convergent pocket therebetween, so as to be convergent adjacent to the side wall of the box to which the blade is joined. The one side member, 23, of each blade is materially shorter and the other, longer, side is in two vertical planes at an angle pronouncedly obtuse. The longer sides of the blades 22 form an acute angle with the side wall of the box 14 thereby presenting an intervening convergent pocket. For directing water to the blades, 22, 23 we provide branch pipes 25 on the hollow standard 12. The branch pipes 25 extend radially outward at opposite sides of the standard 12 or approximately so in practice, and the outer ends are turned laterally thereby forming nozzle ends 26 on the branch pipes. At the nozzle end of each branch pipe, the latter is formed with a lip 27 at the inner side of the nozzle to prevent water from escaping laterally inward from the nozzle and causing it to be directed toward the side of the box 14 and the blades 22, 23 thereof.

The arrangement of the branch pipes 25 and the blades is such that water escaping from said branch pipes and striking the blades and sides of the box 14 will cause said box to revolve. In the revolving of the box, as a blade moves past the nozzle end of a branch pipe 25, water will be first directed into the pocket formed between the longer and shorter sides of the blade and as the longer side moves beyond the branch pipe, the water will be directed to the pocket 24 between the longer side of the blade and the side wall of the box 14, so that the water will be effective against one blade and the box in the region of said blade until the next blade comes into position to be subject to the water escaping from the branch pipe.

The provision of the box 14, closed except for its discharge openings, results in the box being maintained sufficiently filled with water so that an ample volume of water is always maintained at the jet orifices 15 and spasmodic discharge of water from the jet orifices is made impossible, the result being that steady pressure serves to spray steadily and continuously a large area of lawn.

We would state in conclusion that while the illustrated example constitutes a practical embodiment of our invention, we do not limit ourselves to the exact details herein illustrated, since, manifestly, the same can be considerably varied without departure from the spirit of the invention as defined in the appended claims.

Having thus described our invention, we claim:

1. In a sprinkler, a water box mounted to revolve and having jet orifices at the top, blades on the box at the interior, said blades having sides at an angle to the side wall of the box and at an angle to each other, the sides of the blades being convergent toward said wall, and means to direct water under pressure into said box and against said blades.

2. In a revoluble sprinkler, a water box mounted to revolve and having jet orifices, blades on the box at the interior, said blades having longer and shorter sides, the sides of the blades being convergent toward said wall, and means to direct water under pressure into said box and against said blades.

3. In a sprinkler, a revolubly mounted water box having jet orifices, blades on the box at the interior, said blades having inner and outer side members convergent toward the side wall of the box and at an angle to each other, the outer side of each blade being at an angle to said side wall, and means to direct water under pressure into the box and against said blade.

4. In a sprinkler, a revolubly mounted water box having jet orifices, blades on the box at the interior, said blades having inner and outer side members convergent toward the side wall of the box and at an angle to each other, the outer side member of each blade being longer than the inner side member, said longer side of each blade being at an angle to the side wall of the box and forming with said side wall a pocket, and means to direct water under pressure against said blades.

GEORGE WILLIAM COBLENTZ.
JOSEPH ROLLINS FARIES.
HENRY PAUL BOND.